United States Patent Office 3,401,144
Patented Sept. 10, 1968

3,401,144
STABILIZED POLYESTERURETHANES
J. W. Britain, New Martinsville, W. Va., assignor to Mobay Chemical Company, Pittsburgh, Pa., a corporation of Delaware
No Drawing. Filed Dec. 19, 1966, Ser. No. 602,577
10 Claims. (Cl. 260—45.8)

ABSTRACT OF THE DISCLOSURE

Polyesterurethanes stabilized against hydrolysis and aging by use of alkylene carbonate additives.

---

This invention relates to stabilized polyesterurethanes and more particularly, to polyesterurethanes stabilized against hydrolysis and aging and to a process of preparing such stabilized polyesterurethanes.

One of the more serious problems confronting a manufacturer of polyesterurethanes and manufacturers of parts prepared from polyesterurethanes is that degradation takes place over a period of time when conditions are such that hydrolysis can result. This degradation generally occurs at the ester linkage. Various techniques have been utilized in order to improve the stability of polyesters against hydrolysis. One such technique is to incorporate into the polyester either chemically or mechanically, compounds such as carbodiimides or silicones. These materials, while they perform adequately, are expensive and difficult to manufacture because of their exotic chemical structure.

It is therefore an object of this invention to provide polyesterurethanes stabilized against hydrolysis and aging. It is another object of this invention to provide a method of stabilizing polyesterurethanes against hydrolysis and aging. It is a further object of this invention to stabilize resinous compositions against hydrolysis and aging wherein polyesterurethanes are used in their manufacture.

The foregoing objects and others which will become apparent from the following description are accomplished in accordance with the invention generally speaking by providing polyesterurethanes stabilized against hydrolysis and aging by incorporating therein a stabilizing amount of an alkylene carbonate. Generally, an amount of from about 0.1 to about 10% by weight based on the weight of the polyester in the composition is suitable. Although the ester group is the group generally affected by hydrolysis, it has been observed that the stabilizing agent of this invention is effective in polyesterurethanes while no apparent improvement is observed in pure polyesters.

In practicing the process in accordance with this invention, the alkylene carbonate can be added to the polyester, the organic isocyanate or other reactant used in the preparation of the polyesterurethane, such as, a chain extender, or it may be added to the polyesterurethane product. The addition can be made in the dissolved state, by rolling, milling, stirring or any suitable technique.

In the preparation of polyesterurethanes, any suitable polyester may be used, such as those prepared from polycarboxylic acids and polyhydric alcohols. Any suitable polycarboxylic acid may be used such as, for example, benzene tricarboxylic acid, adipic acid, succinic acid, suberic acid, sebacic acid, oxali acid, methyladipic acid, glutaric acid, pimelic acid, azelaic acid, phthalic acid, terephthalic acid, isophthalic acid, thiodipropionic acid, maleic acid, fumaric acid, citraconic acid, itaonic acid and the like.

Any suitable polyhydric alcohol may be used such as, for example, ethylene glycol, propylene glycol, 1,4-butanediol, 1,3-butanediol, 1,5-pentanediol, 1,6-hexanediol, bis-(hydroxy methyl chlorohexane), diethylene glycol, 2,2-dimethyl propylene glycol, 1,3,6-hexanetriol, trimethylol propane, pentaerythritol, sorbitol, glycerine and the like. Also, suitable as polyesters in the preparation of polyesterurethanes are those prepared from lactams, lactones, polyesteramides, and the like.

In the preparation of polyesteramides, an amine is included in the reaction of a carboxylic acid and an alcohol. aminoalcohol or aminoacid can be used. Any suitable amino compound can be used to prepare polyesteramides such as, for example, hexamethylene diamine, ethylene diamine, propylene diamine, butylene diamine, cyclohexyl diamine, phenylene diamine, tolyene diamine, xylylene diamine, 4,4'-diamino-diphenylmethane, naphthylene diamine, aminoethyl alcohol, aminopropyl alcohol, aminobutyl alcohol, aminobenzyl alcohol, aminoacetic acid, aminopropionic acid, aminobutyric acid, aminovaleric acid, aminophthalic acid, aminobenzoic acid and the like. Of course, the amino compounds may be reacted either simultaneously with the ester forming components or sequentially therewith. The pertinent feature is, however, that any polyesterurethane can be stabilized against hydrolysis by the incorporation of an alkylene carbonate.

Any suitable polyisocyanate can be used in the preparation of polyesterurethanes by reaction with a polyester such as, tetramethylene diisocyanate, hexamethylene diisocyanate, 1,4-phenylene diisocyanate, 1,3-phenylene diisocyanate, 1,4-cyclohexylene diisocyanate, 2,4-tolylene diisocyanate, 2,5-tolylene diisocyanate, 2,6-tolylene diisocyanate, 3,5-tolylene diisocyanate, 4-chloro-1,3-phenylene diisocyanate, 1-methoxy-2,4-phenylene diisocyanate, 1-methyl-3,5-diethyl-2,6-phenylene diisocyanate, 1,3,5-triethyl-2 4-phenylene diisocyanate, 1-methyl-3,5-diethyl-2,4- phenylene diisocyanate, 1-, ethyl-3,5-diethyl-6-chloro-2,4-phenylene diisocyanate, 6-methyl-2,4-diethyl-5-nitro-1,3-phenylene diisocyanate, p-xylylene diisocyanate, m-xylylene diisocyanate, 4,6-dimethyl-1,3-xylylene diisocyanate, 1,3-dimethyl-4,6-bis(beta-isocyanatoethyl) benzene, 3-(alpha-isocyanatoethyl) phenylisocyanate, 1-methyl-2, 4-cyclohexylene diisocyanate, 4,4'-biphenylene diisocyanate, 3,3'-dimethyl-4,4'-biphenylene diisocyanate, 3,3'-dimethoxy-4,4'-biphenylene diisocyanate, 3,3'-diethoxy-4,4' - biphenylene diisocyanate, 1,1'bis - (4-isocyanatophenyl) cyclohexane, 4,4'-diisocyanato-diphenylmethane, 4,4' - diisocyanato-3,3'-dimethyldiphenylmethane, 4,4'-diisocyanato - 3,3' - dichlorodiphenylmethane, 4,4'-diisocyanato-diphenyl-dimethylmethane, 1,5-naphthylene diisocyanate, 1,4-naphthylene diisocyanate, 2,4,4'-triisocyanato-diphenylether, 2,4,6, - triisocyanato-1-methyl-3,5,-diethylbenzene, and the like.

The invention is particularly applicable to the stabilization of polyesterurethanes used in the manufacture of synthetic resins which may result in the form of lacquers, foils, coatings, fibers, foam materials, elastomers or casting resins for molded elements.

In the preparation of polyesterurethanes in accordance with this invention, any of the above-mentioned polyesters may be reacted with any of the isocyanates set forth and a chain extending agent containing active hydrogen atoms which are reactive with NCO groups and having a molecular weight less than about 500 such as, for example, water, ethylene glycol, propylene glycol, butylene glycol, 1,4-butanediol, butenediol, butynediol, xylylene glycol, amylene glycol, neopentyl glycol, 2,3-butanediol, 1,4-phenylene-bis-(b-hydroxy ethyl ether), 1,3-phenylene-bis-(b-hydroxy ethyl ether), bis-(hydroxy methylcyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis(2-chloraniline), 3,3-dichloro-4,4'-biphenyl diamine, 2,6-diamino pyridine, 4,4'-diamino diphenyl methane, and the like; alkanol amines such as, for example, ethanol amine, aminopropyl alcohol, 2,2-dimethyl propanol amine, 3-amino cyclohexyl alcohol, p-amino benzyl alcohol and the like; water, hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazine, thiodipropionic acid dihydrazide, tartaric acid dihydrazide, 1,3-phenylene-disulfonic acid dihydrazide, omega-amino-capronic acid dihyrazide, gamma-hydroxy butyric hydrazide, bis-semi-carbazide, bis-hydrazine carbonic esters of glycols such as many of the glycols heretofore mentioned and the like.

The stabilization of polyesterurethanes in accordance with this invention is advantageous for the reason that the alkylene carbonates show an increased effectiveness since they do not polymerize with themselves, they can be added to polyesters prior to reaction with polyisocyanates to produce polyurethanes because they neither accelerate the polyaddition reaction nor enter into reaction with the isocyanates in such a manner to thereby reduce the number of carbamate groups formed.

Any suitable alkylene carbonate can be used in a stabilizing amount in order to prepare the stabilized polyesterurethane in accordance with this invention such as, for example, ethylene carbonate, 1,2-propylene carbonate, 1,2-butylene carbonate, 2,3-butylene carbonate, 1,2-amylene carbonate, 2,3-amylene carbonate, 1,2-hexylene carbonate, 2,3-hexylene carbonate, 3,4-hexylene carbonate, alpha, beta-styrene carbonate and the like. Any suitable alkylene carbonate having the formula

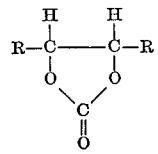

may be used wherein R is hydrogen, lower alkyl and phenyl. A suitable method for preparing alkylene carbonate suitable for use in this invention is to react a 1,2-glycol having the formula

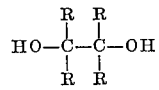

wherein R has the same significant sign set forth above, with phosgene.

The stabilized polyesterurethanes in accordance with this invention are stabilized to even a greater degree by the incorporation of carbodiimides. Carbodiimides are known to stabilize polyesters. The use of both carbodiimides and alkylene carbonates act synergistically to improve polyesterurethanes against hydrolysis. The combination is superior to either used alone even when the parts by weight of either used alone equals the total parts by weight of the combination. Any suitable carbodiimide may be used such as those disclosed in United States Patent Nos. 3,193,522, 3,193,523, 3,193,524 and 3,193,525.

The invention is further illustrated but not limited by the following examples in which parts are by weight unless otherwise specified.

Example 1(a).—Preparation of a polyesterurethane control

To about 100 parts of an hydroxyl polyester having a molecular weight of about 2000 and an hydroxyl number of about 56, and prepared from 11 mols of ethylene glycol and 10 mols of adipic acid are added about 60 parts of 4,4'-diphenylmethane diisocyanate and about 16 parts of butanediol. The reaction mixture is cast onto a heated plate to form specimen suitable for testing. The control sample exhibits the following physical properties:

| | Before hydrolysis | 48 hours, 100° C., 100% relative humidity | 96 hours, 100° C., 100% relative humidity |
|---|---|---|---|
| Tensile strength, p.s.i | 10,080 | 3,830 | 840 |
| Elongation at break | 600 | 690 | 160 |
| Elongation set, percent (10 min. after break) | 30 | 105 | 10 |
| Modulus: | | | |
| 100% | 1,190 | 1,020 | 840 |
| 300% | 2,260 | 1,550 | |
| Hardness, Shore A | 93 | 92 | 89 |
| Tear strength, p.l.i | 755 | 790 | 80 |

Example 1(b)

The procedure of Example 1(a) is followed with the exception that 1% based on the weight of the polyester of ethylene carbonate is mixed with the polyester before reaction with the polyisocyanate. The resulting test specimen exhibit the following characteristics:

| | Before hydrolysis | 48 hours, 100° C., 100% relative humidity | 96 hours, 100° C., 100% relative humidity |
|---|---|---|---|
| Tensile strength | 8,220 | 7,700 | 3,140 |
| Elongation at break | 560 | 590 | 500 |
| Set, percent | 30 | 40 | 60 |
| Modulus 100, p.s.i | 1,240 | 1,230 | 1,120 |
| Hardness, Shore A | 93 | 92 | 90 |
| Tear strength, p.l.i | 570 | 490 | 545 |

Example 1(c)

The procedure of Example 1(a) is repeated with the exception that 5% of ethylene carbonate based on the weight of the polyester is incorporated into the polyester before reaction with the organic polyisocyanate. The resulting test specimen exhibit the following physical properties:

| | Before Hydrolysis | 48 hours, 100° C., 100% relative humidity |
|---|---|---|
| Tensile strength | 7,610 | 5,620 |
| Elongation, percent | 550 | 570 |
| Set, percent | 28 | 65 |
| Tear strength, p.l.i | 532 | 680 |

It is observed that the initial tensile strength of the specimen before hydrolysis testing exhibits a decrease over that of the control. It is believed that this is due to the plasticizing effect of the additive. It is noted, however, that the properties after 48 hours are dramatically increased over the unstabilized polyester.

Example 1(d)

The procedure fo Example 1(a) is again repeated, however, 1% of propylene carbonate based on the weight of the polyester used is mixed with the polyester before reaction with the polyisocyanates. The test specimen thus resulting exhibit the following physical properties:

| | Before hydrolysis | 48 hours, 100° C., 100% relative humidity |
|---|---|---|
| Tensile strength | 6,468 | 4,770 |
| Elongation at break, percent | 560 | 590 |
| Set, percent | 31 | 90 |
| Tear strength, p.l.i | 637 | 620 |

Example 2(a).—Control

The procedure of Example 1(a) is repeated with the exception that the polyester is prepared from 11 mols of butanediol and 10 mols of adipic acid. The polyester, as in Example 1(a), has an hydroxyl number of 56 and a molecular weight of about 2000. The resulting polyurethane test specimen exhibit the following physical properties:

|  | Before hydrolysis | 48 hours, 100° C., 100% relative humidity | 96 hours, 100° C., 100% relative humidity |
|---|---|---|---|
| Tensile strength | 7,750 | 7,675 | 4,530 |
| Elongation at break, percent | 430 | 530 | 510 |
| Set, percent | 10 | 30 | 49 |
| Modulus: | | | |
| 100 percent | 1,250 | 1,220 | 1,250 |
| 300 percent | 3,880 | 2,740 | 2,390 |
| Shore A Hardness | 92 | 92 | 93 |
| Tear strength, p.l.i | 400 | 670 | 828 |

Example 2(b)

The procedure of Example 2(a) is repeated with the exception that 1% based on the weight of the polyester of ethylene carbonate is added to the polyester before reaction with the polyisocyanate. The polyurethane test specimen indicate the following physical properties:

|  | Before hydrolysis | 48 hours, 100° C., 100% relative humidity | 96 hours, 100° C., 100% relative humidity |
|---|---|---|---|
| Tensile strength | 7,030 | 7,510 | 7,670 |
| Elongation at break percent | 400 | 520 | 580 |
| Set, percent | 10 | 25 | 42 |
| Modulus: | | | |
| 100 percent | 1,290 | 1,205 | 1,230 |
| 300 percent | 3,820 | 2,735 | 2,530 |
| Hardness, Shore A | 92 | 92 | 97 |
| Tear strength, p.l.i | 400 | 635 | 846 |

Example 3(a).—Comparison example

To about 100 parts of an hydroxyl polyester having a molecular weight of about 2000 and an hydroxyl number of about 56 and prepared by reacting 11 parts butanediol and 10 mols of adipic acid are added 33 parts of bis-(beta-hydroxyl ethyl ether) of hydroquinone and about 60 parts of 4,4'-diphenylmethanediisocyanate. The materials are intimately mixed for approximately one minute and cast onto a plate. Test specimen are prepared and exhibit the following physical properties:

|  | Before Hydrolysis | 48 hours 100° C., 100% relative humidity |
|---|---|---|
| Tensile strength, p.s.i | 6,010 | 3,080 |
| Elongation at break, percent | 510 | 470 |
| Set, percent | 65 | 80 |
| Tear strength, p.l.i | 865 | 360 |

Example 3(b)

The procedure of Example 3(a) is repeated, however, 1% based on the weight of the polyester of ethylene carbonate is added to the polyester before reaction with the isocyanate. The test specimen thus prepared exhibit the following physical characteristics:

|  | Before Hydrolysis | 48 hours 100° C., 100% relative humidity |
|---|---|---|
| Tensile strength, p.s.i | 5,950 | 6,050 |
| Elongation, percent | 440 | 440 |
| Set, percent | 50 | 40 |
| Tear strength, p.l.i | 370 | 410 |

It is, of course, to be understood that the examples are illustrative and not for the purpose of limiting the invention and that any polyesterurethane such as those more particularly described above can be stabilized by incorporating therein an alkylene carbonate as set forth. Any of the alkylene carbonates set forth may be used throughout the working examples as a substitute for those specifically used.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A polyesterurethane stabilized against hydrolysis and aging by having incorporated therein a stabilizing amount of an alkylene carbonate.

2. The stabilized polyesterurethane of claim 1 wherein the alkylene carbonate has the formula

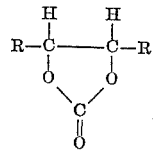

wherein R is hydrogen lower alkyl and phenyl.

3. The stabilized polyesterurethane of claim 1 wherein the alkylene carbonate is ethylene carbonate.

4. The stabilized polyesterurethane of claim 1 wherein the alkylene carbonate is propylene carbonate.

5. The stabilized polyesterurethane of claim 1 wherein the alkylene carbonate is present in an amount of 0.1 to about 10% by weight based on the weight of the polyester.

6. The polyesterurethane of claim 1 wherein the polyesterurethane is prepared by reacting an hydroxyl polyester with an organic polyisocyanate.

7. The polyesterurethane of claim 6 wherein the polyisocyanate is tolylene diisocyanate.

8. The polyesterurethane of claim 6 wherein the polyisocyanate is 4,4'-diphenylmethane diisocyanate.

9. The polyesterurethane of claim 6 wherein the polyester is a polyhydric alcohol adipate.

10. The polyesterurethane of claim 1 wherein a stabilizing amount of an alkylene carbonate and a stabilizing amount of a carbodiimide are incorporated.

References Cited

UNITED STATES PATENTS 3,071,600    1/1963    Tinsley _____ 260—45.8 XR
3,351,608    11/1967    Oertel et al. ____ 260—45.8 XR DONALD E. CZAJA, *Primary Examiner.*

M. J. WELSH, *Assistant Examiner.*